Figure 1:
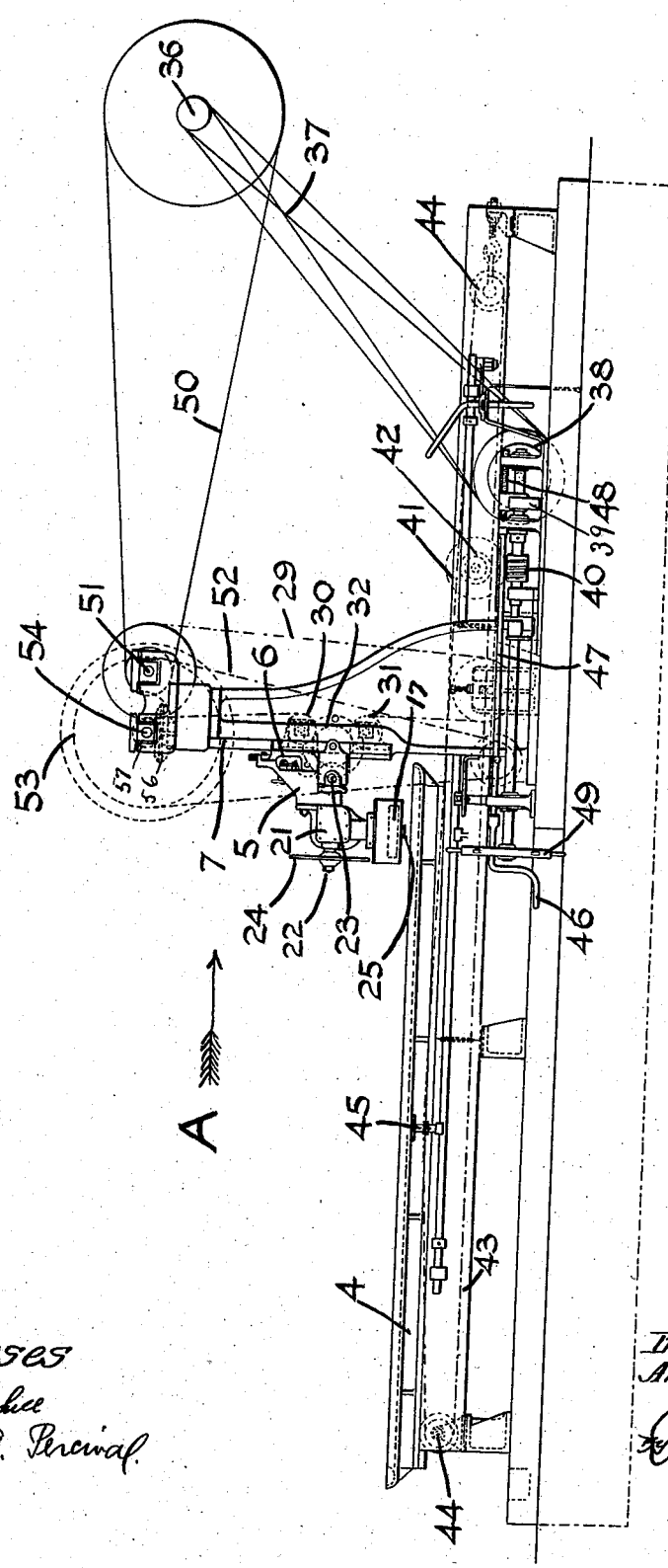

No. 892,990.

PATENTED JULY 14, 1908.

A. G. GRICE.
STONE DRESSING MACHINE.
APPLICATION FILED AUG. 19, 1905.

7 SHEETS—SHEET 2.

Witnesses
H.M. Kuehne
John A. Percival

Inventor
Arthur G. Grice

By Richardson
Attorneys

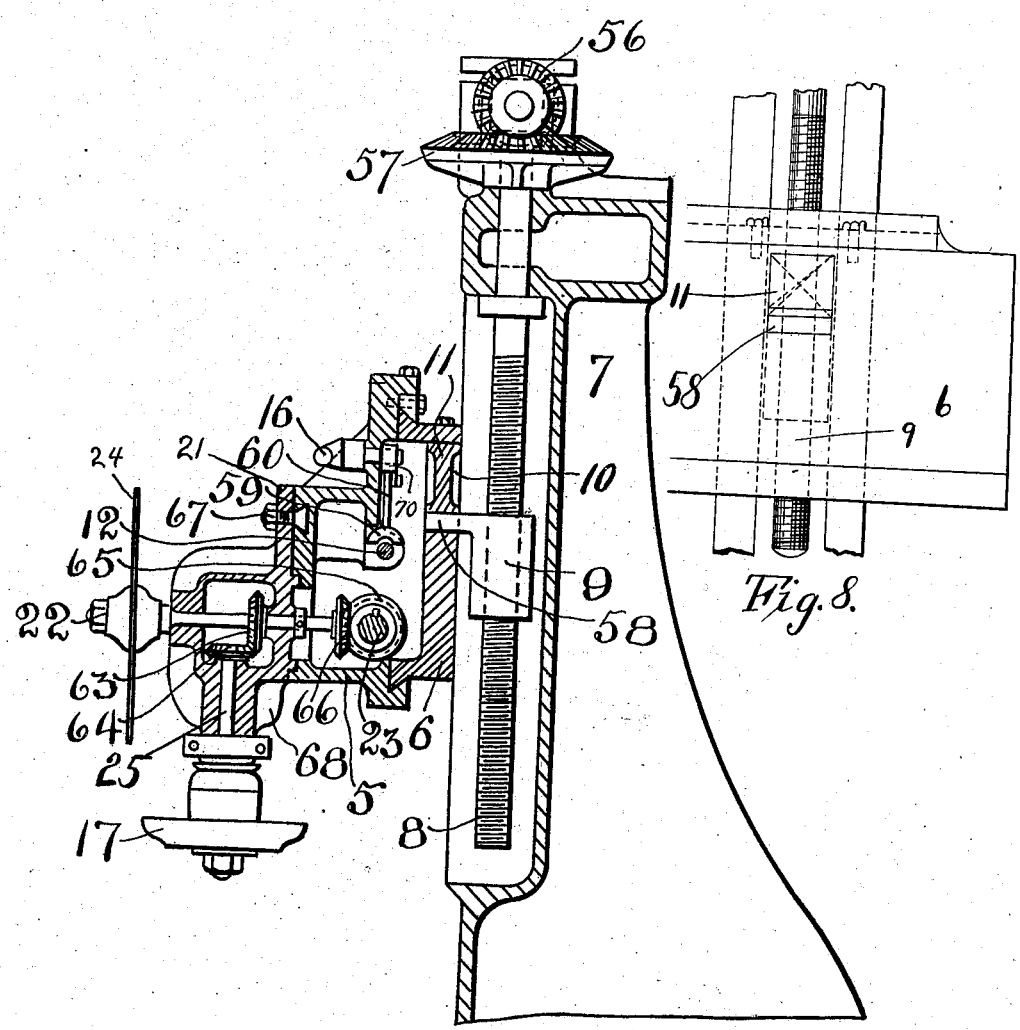

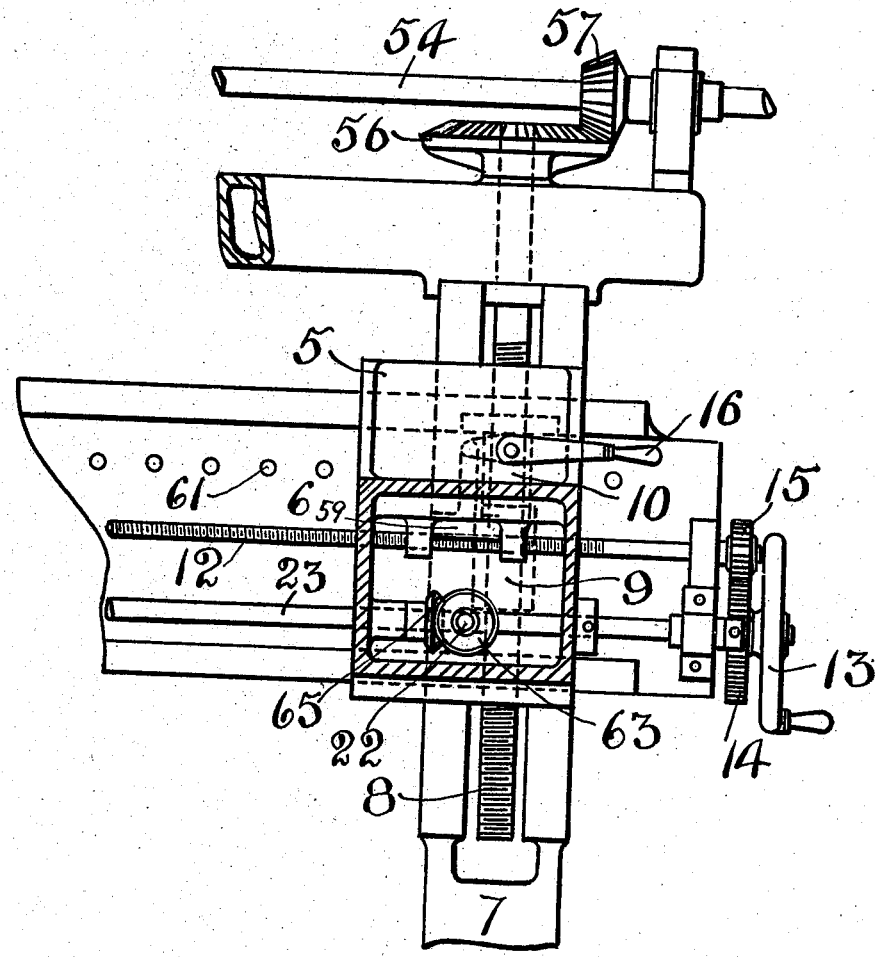

UNITED STATES PATENT OFFICE.

ARTHUR G. GRICE, OF CARNOUSTIE, SCOTLAND.

STONE-DRESSING MACHINE.

No. 892,990.     Specification of Letters Patent.    Patented July 14, 1908.

Application filed August 19, 1905. Serial No. 274,901.

*To all whom it may concern:*

Be it known that I, ARTHUR GEORGE GRICE, a subject of the King of Great Britain and Ireland, and a resident of Carnoustie, in the county of Forfar, Scotland, (whose post-office address is Taymouth Engineering Works, Carnoustie,) have invented a certain new and useful Improvement in Stone-Dressing Machines, (for which I have applied for a patent in Great Britain, No. 22,043, bearing date October 13, 1904,) of which the following is a specification.

This invention relates to automatic stone sawing, molding and dressing machines, the objects being to provide a machine which will saw stones in any suitable desired direction or angle, which will mold the stone to any desired curve, or combination of curves and which will dress the same flat stepped or curved. And in order that my said invention and the manner of performing or carrying the same into effect or practice may be properly understood, I have hereunto appended seven explanatory sheets of drawings in which the same reference numerals are used to indicate corresponding parts in all the figures where shown, that is to say:—

Figure 2:
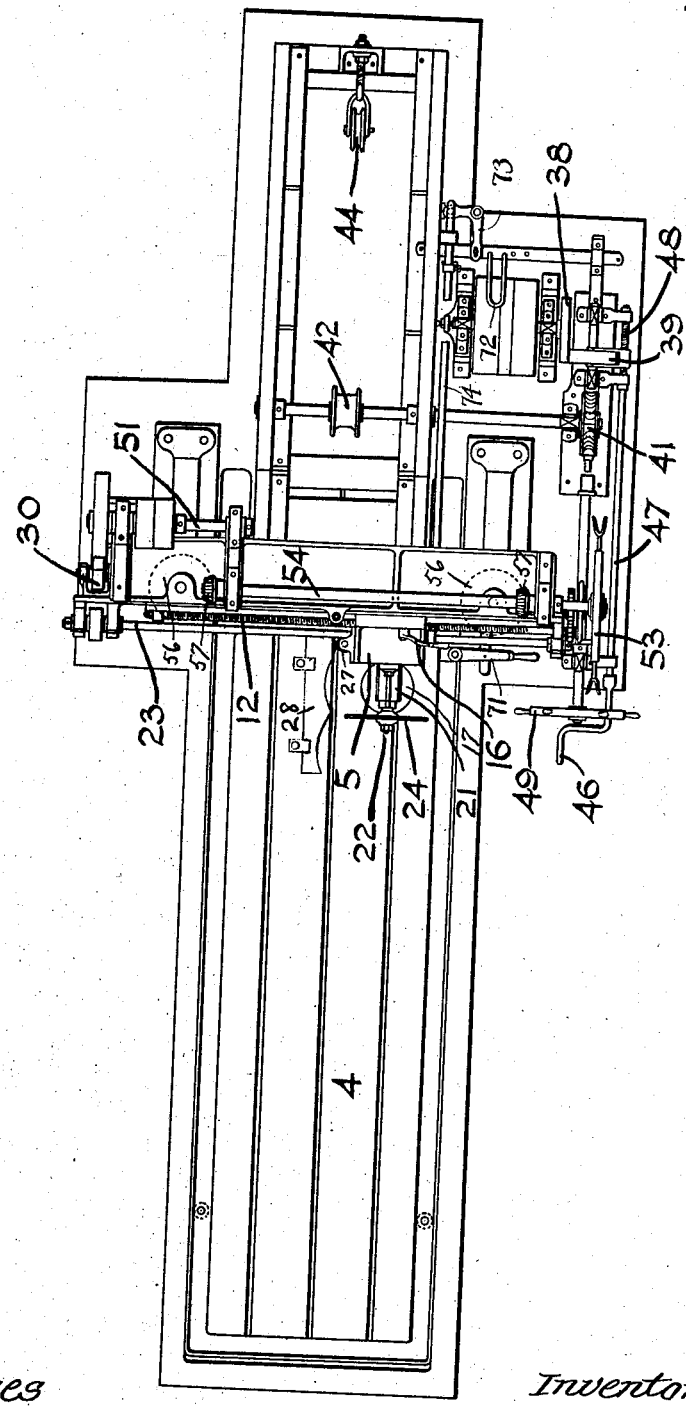

Figure 1 (Sheet 1) is a side elevation of a machine constructed in accordance with my invention. Fig. 2 (Sheet 2) is a plan of same and Fig. 3 (Sheet 3) is a face view looking in the direction of the arrow A (Fig. 1). Fig. 4 (Sheet 4) is a side elevation showing how the machine can be modified to allow of the brackets and the cross-slide rising or falling to a limited extent as the table reciprocates and Fig. 5 (Sheet 5) is a view looking in the direction of the arrow B (Fig. 4). Fig. 6 is an enlarged part side elevation of the upright carrying the cross slide shown in Fig. 1. Fig. 7 is an enlarged part front elevation of Fig. 6. Fig. 8 shows a face view of the cross guide 6 with the slide 5 removed.

In carrying out my invention, I use a machine somewhat similar to a planing machine, that is to say the table 4 on which the stone to be operated upon lies, can move backwards or forwards and the tool rest or slide 5 can rise and fall, or move across the surface of the table, such rest or slide being actuated by hand or by power.

The cross guide 6 which carries the tool rest or slide (Figs. 1, 2 and 3) can move on two upright guides 7 being actuated by two vertical screws 8, one at each end, these being driven by the cross shaft 54 and the bevel wheels and pinions 56 and 57. Provision is made for permitting the cross-guide 6 to freely rise and fall to a limited extent and this may be done as is shown more particularly in Figs. 4, 5, 6 and 7 by causing the nut 9 for each upright screw to engage with a slot 10 or bracket in or on the cross guide, such slot being longer than the nut, the arrangement being such that when the cross guide is to be controlled by the upright screws 8 a removable block 11 is inserted into each slot in order to keep the nuts from moving relative to the cross guide, that is to say the projection 58 engages rigidly with the cross slide when the block 11 is in position, but when it is removed the cross-slide can rise or fall relative to the nut by an amount equal to the length of the block 11.

The tool rest or slide 5 (Figs. 1, 2 and 3) Figs. 6 and 7 can be moved across the cross-guide 6 by means of a half nut 59 and screw 12 operated by the hand by means of the hand wheel 13 and spur wheels 14 and 15 or by power, and when it is required to permit the tool rest 5 to move freely, the half nut is disengaged from its screw 12 by means of a hand lever 16 having a crank 70 and connecting rod 60 by lifting such nut off the screw.

The tool rest 5 has to be free to move backwards or forwards sometimes, in order to cause the tool 17 to bear against the stone 18 and such freedom is obtained by disengaging the half nut 59 from its screw 12 by the lever 16 and the crank 70 which raises the connecting rod 60 and nut 59 at which time a weighted lever 19 is provided which causes the tool rest to always tend to move away from the weighted lever thus pressing the roller 27 against the templet 28 such roller being carried by the tool rest. The weighted lever 19 is pivoted on the cross-guide, 61 being the pivot holes and the roller 62 bearing on the side of the tool rest gives the necessary lateral pressure. On the tool rest 5, Figs. 6 and 7, is fitted an adjustable bracket 21 which can be set to any desired angle, such bracket being movable about an axis. Such axis is the center of a short shaft 22 which lies parallel to the longitudinal axis of the machine and this short shaft is driven by a shaft 23 carried by the cross-guide and the tool rest, this shaft carrying a sliding bevel wheel 65 which is in gear with another 66 on the short longitudinal shaft. On the outer extremity of such short shaft may be a cross cut diamond or other saw 24 or carborundum or other abrasive disks, the saw being used for cutting and the carborundum disks for molding or abrading the stone.

Near the middle of the short shaft 22 is fixed a bevel wheel 63 which gears into another 64 on a short shaft 25 lying at right angles to the first shaft and capable of being adjusted and fixed at any desired angle, its axis being always in the same radial plane. In the drawings the axis of this shaft is shown at right angles to the face of the table. It can be adjusted to any angle by causing it to be inclined to any desired extent by loosening the bolt 67 and sliding the portion 68 of the bracket round. On the extremity of this second short shaft 25 may be mounted either the saw 24 or carborundum or other abrasive disks 17 as previously referred to.

Depending from the tool rest is a vertical shaft and on its lower extremity is a guide roller 27, its purpose being to bear against a templet 28 fixed on the stone 18 as shown, or on the table and thus cause the tool rest to move in sympathy with the face of such templet, and with it the abrading disk 17.

The saw 24 or the disks 17 are rotated by means of the shaft 23 on which is the sliding bevel wheel, such shaft being driven either by a belt pulley, or by spur gearing, in the drawings belt gearing is shown. If a belt 29 be used it runs vertically and by means of two guides pulleys 30 and 31 placed equally on both sides of the driven pulley 32 the belt when running on or off such driven pulley being nearly horizontal. By such means the tool rest can rise or fall while a constant tension is maintained on the belt, and the shaft 23 is continuously rotated.

Figure 4:
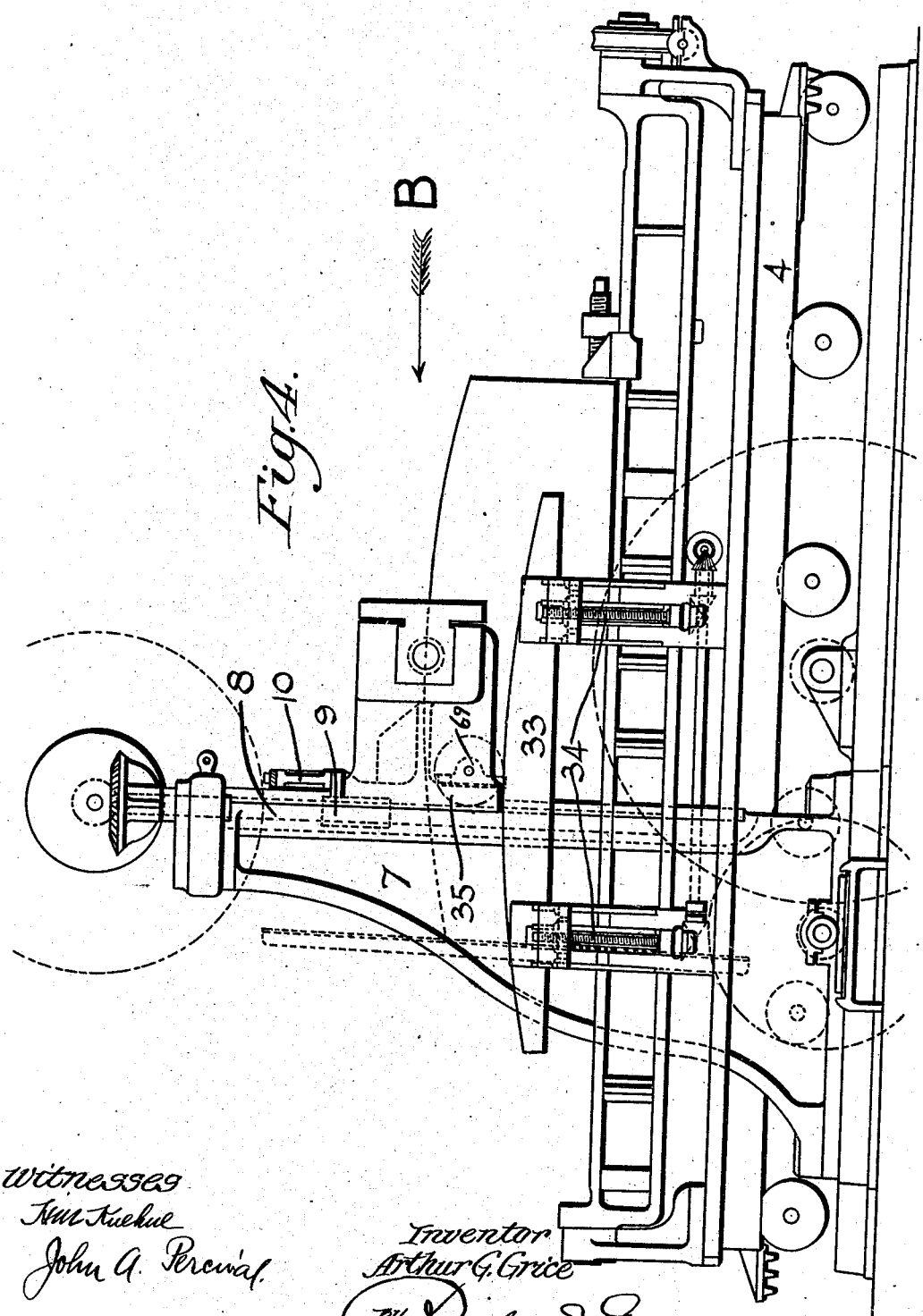
Figure 5:
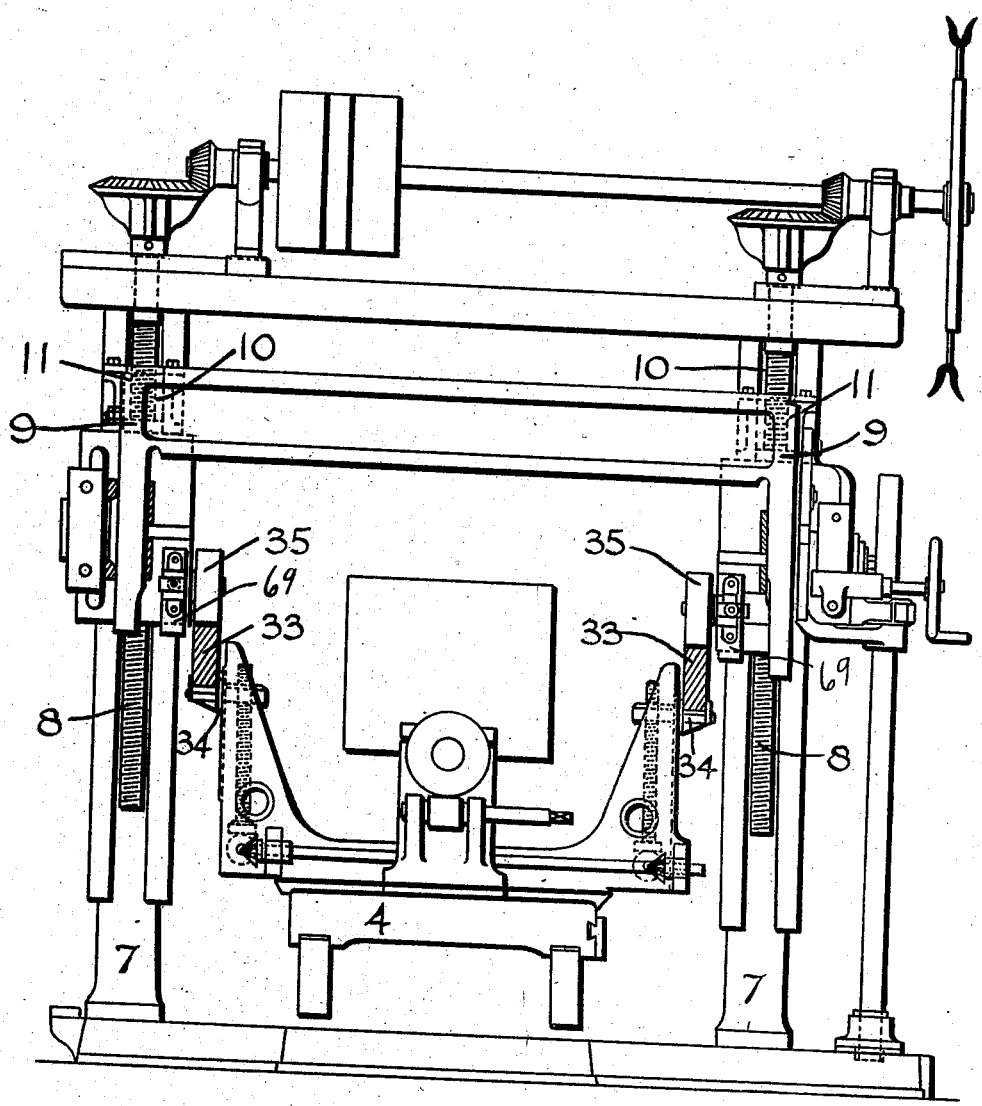

Sometimes I may cause the cross-guide 6 to rise and fall to a limited extent when the table reciprocates and how this is done is more particularly shown by Figs. 4 and 5 of the drawings. When this has to be done two templets 33 are used being carried by adjustable brackets 34 on each side of the table, the weight of the cross-guide 6 and tool rest 5 being supported by rollers 35 carried by brackets 69 on the cross-guide, the nuts 9 on the cross-guide screws 8 at that time being free to move relative to their slots, as previously explained.

In some cases the two sets of templets may be used in combination that is to say the cross-guide may be made to rise or fall by means of its templets 33 and the tool rest may be made to move along the cross-guide by its templet 28.

In a machine of the type referred to stones may be cut and molded in any suitable manner and such moldings may be straight or curved according to the templet or templets used and the configuration of the cutting surfaces of the carborundum disks.

Figure 3:
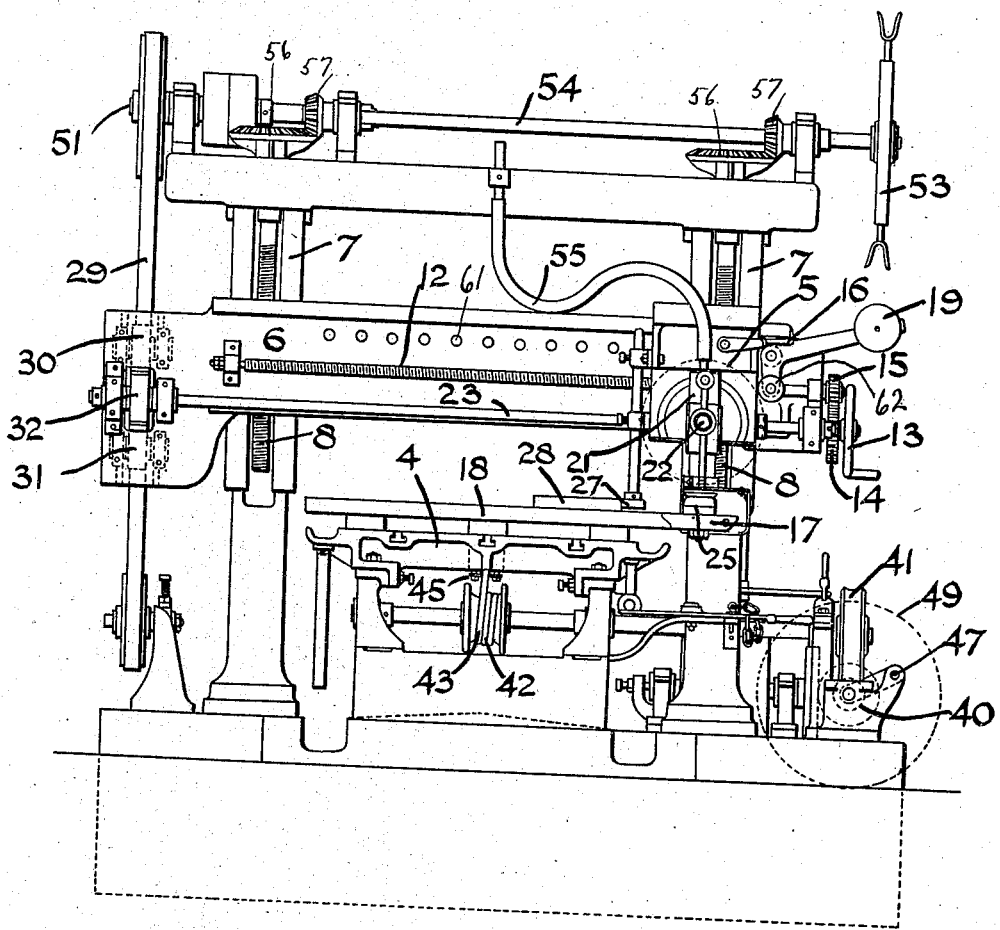

In operating the machine illustrated by Figs. 1, 2 and 3 the table 4 is reciprocated from the countershaft 36 by means of the open and crossed belts 37 operating alternately and thus causing the friction pulley 38 to alternately rotate in one direction or the other. This friction pulley operates another 39 which in turn causes the worm 40 the frictional wheel 39 and the worm 40 being on the same shaft to rotate the worm wheel 41 and with it the rope pulley 42. This rope pulley actuates a rope 43 which passes over guide pulleys 44 its ends being attached to the table at 45. As the rope is pulled backwards or forwards so will the table 4 be moved.

46 is a handle on a shaft 47 for actuating a screw 48 whose purpose is to slide the friction pulley 39 towards or away from the center of the driving friction 38 and thus alter the rate of reciprocation.

49 is a hand wheel on a shaft which can be made to engage with the worm shaft and thus move the table by hand.

The tools are operated from the countershaft 36 by means of the belt 50 shaft 51 and belt 29 and the tool rest 6 is raised or lowered by the hand rope 52 which can actuate the wheel 53 cross-shaft 54 and screws 8.

55 is a flexible pipe for conveying water to the tools.

The hand lever 71 is for operating the reversing gear 72 by means of the bell crank 73 and the rod 74.

Having now described my invention, what I claim as new and desire to secure by Letters Patent is:—

1. In stone dressing machines, the combination of a reciprocatory table on which the stone is carried, a cross guide, vertical screws for raising and lowering said cross guide, a cross shaft and bevel wheels for actuating said screws, a slide on the cross guide, a screw, a pinion thereon, a hand wheel with spur wheel gearing with the pinion, a half nut coupling the screw with the slide, a handle for the nut, a saw and wheel carried by and operated from such slide, a dependent guide roller carried by the slide, a templet on the table, a weighted lever whose position is adjustable for pressing the guide roller against the templet when the half nut is disengaged, a shaft on the cross guide for actuating the saw shaft and the wheel, a belt of constant tension for operating said shaft a pulley and guide pulleys on which the belt runs, so that the cross guide can be raised or lowered, a reversible friction driving wheel, means for operating the same, a frictionally driven wheel whose position relative to the driver can be adjusted, a worm operated by the frictionally driven wheel, a worm wheel actuated by said worm, a cross shaft operated by said worm wheel, a rope pulley on said cross shaft, an endless rope actuated by said pulley and having a complete turn round such pulley and also passing round guide pulleys at each end of the machine, means for attaching such rope to the center of the table so that it can be drawn backwards and forwards, as described.

2. A stone dressing machine comprising a reciprocating table, a cross guide, means for moving said cross guide vertically, means for disconnecting said moving means so as to permit said guide to be moved vertically a limited extent by the table, a slide on the guide, means for moving said slide across the guide, said means including a half nut, means for moving said nut out of engagement with the slide, and a tool carried by said slide.

Dated this 18th day of July 1905.

In witness whereof I have hereunto set my hand in presence of two witnesses.

ARTHUR G. GRICE.

Witnesses:
WILLIAM B. LOGIE,
MAUD CARGILL.